US008768916B1

(12) United States Patent
Ghazal

(10) Patent No.: US 8,768,916 B1
(45) Date of Patent: Jul. 1, 2014

(54) MULTI LEVEL PARTITIONING A FACT TABLE

(75) Inventor: Ahmad Said Ghazal, Redondo Beach, CA (US)

(73) Assignee: Teradata US, Inc., Dayton, OH (US)

( * ) Notice: Subject to any disclaimer, the term of this patent is extended or adjusted under 35 U.S.C. 154(b) by 117 days.

(21) Appl. No.: 13/332,695

(22) Filed: Dec. 21, 2011

(51) Int. Cl.
G06F 17/30 (2006.01)

(52) U.S. Cl.
USPC ........................................... 707/719

(58) Field of Classification Search
USPC ......... 707/602, 605, 693, 696, 713, 715, 737, 707/999.003
See application file for complete search history.

(56) References Cited

U.S. PATENT DOCUMENTS

| 2004/0034616 | A1* | 2/2004 | Witkowski et al. | 707/1 |
| 2009/0037365 | A1* | 2/2009 | Sinclair et al. | 707/2 |
| 2010/0082655 | A1* | 4/2010 | Silberstein et al. | 707/759 |
| 2010/0180057 | A1* | 7/2010 | Navarro et al. | 710/115 |
| 2011/0313999 | A1* | 12/2011 | Bruno et al. | 707/718 |
| 2012/0158650 | A1* | 6/2012 | Andre et al. | 707/611 |

OTHER PUBLICATIONS

Daniel C. Zilio, Jun Rao, Sam Lightstone, Guy Lohman, Adam Storm, Christian Garcia-Arellano, Scott Fadden, DB2 Design Advisor: Integrated Automatic Physical Database Design, Proceedings of the 30th VLDB Conference, Toronto, Canada, 2004.

Pat O'Neil, Betty O'Neil, Xuedong Chen, Star Schema Benchmark 1-8 and 2-3.
Paul Sinclair, Using PPIs to improve performance, Teradata Magazine (Sep. 2008, Teradata Corporation).
Sam S. Lightstone, Biswaranjan Bhattacharjee, Automated design of multidimensional clustering tables for relational databases, Proceedings of the 30th VLDB Conference 1170-1181,Toronto, Canada, 2004.
Sanjay Agrawal, Surajit Chaudhuri, Lubor Kollar, Arun Marathe, Vivek Narasayya, Manoj Syamala, Database Tuning Advisor for Microsoft SQL Server 2005, Proceedings of the 30th VLDB Conference, Toronto Canada, 2004.
Sanjay Agrawal, Vivek Narasayya, Beverly Yang, Integrating Vertical and Horizontal Partitioning into Automated Physical Database Design, SIGMOD 2004 at 359-370, Jun. 13-18, 2004, Paris, France.

* cited by examiner

Primary Examiner — Mohammed R Uddin
(74) Attorney, Agent, or Firm — Howard Speight

(57) ABSTRACT

Inputs are received. The inputs are a star schema data model comprising a non-partitioned fact table (F) comprising fields $(f_1, f_2, \ldots f_n)$; a set of queries $(Q=q_1, q_2, \ldots q_m)$; and a set of weights for each query in Q. Each weight defines the priority of a respective query in a workload. The inputs are preprocessed to produce a most-granular-partitioning. The most-granular-partitioning is processed to produce an initial multi-level partitioned primary index, the processing including determining the scan cost of one of the queries in Q. The initial multi-level partitioned primary index is processed to produce a final multi-level partitioned primary index, the processing including determining the query cost of one of the queries in Q. F is partitioned using the final multi-level partitioned primary index. A query from Q is run against F to produce a result. The result is stored.

20 Claims, 10 Drawing Sheets

MULTI LEVEL PARTITIONING A FACT TABLE

BACKGROUND

Database tables in a star schema, i.e., databases with a fact table and a plurality of dimension tables, are often partitioned to improve performance. Partitioned Index (or "PI") refers to the hash partitioning of a table. Partitioned primary index (or "PPI") refers to an optional horizontal partitioning performed on top of the hash partitioning (specified by PI). A PPI can have a single level, in which partitioning is performed based on one field, or it can have multiple levels, sometimes nested, in which partitioning is performed based on a plurality of fields. The latter partitioning technique is called multi-level PPI or MLPPI. PPI and MLPPI can be used to reduce the amount of data read from a storage system in response to a query. In general, only data blocks with matching partition values are read. With correct partitioning, the query workload and disk I/O can be reduced. Selecting the MLPPI columns is a challenge.

SUMMARY

In general, in one aspect, the invention features a method. The method includes receiving inputs. The inputs are a star schema data model comprising a non-partitioned fact table (F) comprising fields $(f_1, f_2, \ldots f_n)$; a set of queries $(Q=q_1, q_2, \ldots q_m)$; and a set of weights for each query in Q. Each weight defines the priority of a respective query in a workload. The method further includes preprocessing the inputs to produce a most-granular-partitioning. The method further includes processing the most-granular-partitioning to produce an initial multi-level partitioned primary index, the processing including determining the scan cost of one of the queries in Q. The method further includes processing the initial multi-level partitioned primary index to produce a final multi-level partitioned primary index, the processing including determining the query cost of one of the queries in Q. The method further includes partitioning F using the final multi-level partitioned primary index. The method further includes running a query from Q against F to produce a result. The method further includes storing the result.

Implementations of the invention may include one or more of the following. Preprocessing the inputs to produce a most granular partitioning may include:
  extracting a set of conjunct predicates $(P=p_1, p_2, \ldots p_O)$ from Q, each conjunct predicate having the form:
    <variable><op><constant>;
  where:
    <variable>$\epsilon(f_1, f_2, \ldots f_n)$
    <op>$\epsilon\{=, <, \leq, \geq, >, IN\}$; and
    <constant> is a constant;
  constructing a map, M1, between Q and P;
  converting the conjunct predicates to ranges;
  constructing an array, R, of the form:

| $f_1$ | $f_2$ | ... | $f_n$ |
|---|---|---|---|
| r[1, 1] | r[2, 1] | ... | r[n, 1] |
| r[1, 2] | r[2, 2] | ... | r[n, 2] |
| ... | ... | ... | ... |
| r[1, $last_1$] | ... | ... | ... |
|  | r[2, $last_2$] | ... | ... |
|  |  |  | r[n, $last_n$] | where
    r[i,j] is the i-th field's j-th range in R, where r[i,j] has a start value,
    r[i,j]_start, and an end value r[i,j]_end; and
    $last_1, last_2, \ldots, last_n \geq 1$;
  constructing a map, M2, between R and P, of the form:
    <$p_1, r_{11}, r_{12}, \ldots r_{1last}$>
    <$p_2, r_{21}, r_{22}, \ldots r_{2last}$>
    ...
    <$p_O, r_{O1}, r_{O2}, \ldots r_{Olast}$>
  where
    $r_{ab}$ is the $b^{th}$ range associated with conjunct predicate
      $p_a \epsilon(p_1, p_2, \ldots, p_O)$;
    and
    $r_{1last}, r_{2last}, \ldots, r_{Olast} \geq 1$;
  splitting overlapping ranges in R to produce R_updated, R_updated being the most-granular-partitioning;
  constructing a map, M, between R_updated and Q, of the form:
    <$q_1$, ranges from fields in conjunct predictes in $q_1$>
    <$q_2$, ranges from fields in conjunct predictes in $q_2$>
    ...
    <$q_m$, ranges from fields in conjunct predictes in $q_m$>.
Splitting overlapping ranges in R may include:
  for each field in R:
    L←list of r[i,j] from R sorted by r[i,j]_start;
    while L has overlapping ranges do:
      r1, r2←consecutive ranges in L
      if r1_end≥r2_start:
        modify r1 and r2 in a non-decreasing order;
        insert into L an intermediate range, if needed;
        re-sort ranges in L;
      else:
        r1←r2, r2←r3, r3 being the next higher range in L; and
    update R with L.
Processing the most granular partitioning to produce an initial multi-level partitioned primary index may include:
  (a) determining that the product:
    S=(the number of ranges associated with $q_1$ in M)×
    (the number of ranges associated with $q_2$ in M)×
    ...
    (the number of ranges associated with $q_m$ in M)
  is greater than T, the number of partitions allowed by a database system, and, in response:
    finding the two ranges associated that, when merged, have the smallest weighted scan cost for each query in Q; and
    merging the two found ranges in R_update;
  (b) repeating (a) until the product S is less than or equal to T;
Finding a scan cost for a query $q_t \epsilon Q$, and merge-candidate ranges $r_1$ and $r_2$, $r_1$ and $r_2$ being ranges associated with $q_t$ in M may include:
  creating range $r_3$ as the merger of ranges $r_1$ and $r_2$;
  L←ranges associated with q;
  removing $r_1$ and $r_2$ from L and adding $r_3$ to L;
  s←"Explain SELECT * FROM F WHERE";
  for each range rεL:
    convert r to an equivalent predicate p; and
    add p to WHERE clause of s;
  make an API call to the database system with s to produce a result;
  extract a spool size in bytes from the result; and
  compute a number of blocks from the spool size.

Processing the initial multi-level partitioned primary index to produce a final multi-level partitioned primary index may include:

(c) finding two ranges associated with a query belonging to Q and a variable in the query that, when merged, have the smallest weighted query cost;

(d) merging the two ranges in R_update; and repeating (c) and (d) for a number of iterations; partitioning F using R_update as a guide.

Finding a query cost for a query $q_t \in Q$, with merge-candidate ranges $r_1$ and $r_2$, $r_1$ and $r_2$ being ranges associated with $q_t$ in S may include:

creating in a database system a shadow table ST as F with no data;
propagating the statistics of F to ST;
creating range $r_3$ as the merger of ranges $r_1$ and $r_2$;
copying ranges associated with q into L;
removing $r_1$ and $r_2$ from L and adding $r_3$ to L;
computing a partitioning clause PC by:
    creating an alter statement to partition ST so that each range in L defines a partition;
altering ST based on PC;
creating an explain statement for $q_t$ and
determining a query cost of executing $q_t$ against ST by making an API call to the database system with the explain statement to produce a result:
    estimating the processing time from the result; and
    returning the estimated processing time as the query cost.

In general, in one aspect, the invention features a database system. The database system includes one or more nodes. The database system further includes a plurality of CPUs, each of the one or more nodes providing access to one or more CPUs. The database system further includes a plurality of virtual processes. Each of the one or more CPUs provides access to one or more virtual processes. Each virtual process is configured to manage data, including rows from the set of database table rows, stored in one of a plurality of data-storage facilities. The database system further includes a process. The process receive as inputs:

a star schema data model comprising a non-partitioned fact table (F) comprising fields ($f_1, f_2, \ldots f_n$);
a set of queries (Q=$q_1, q_2, \ldots q_m$); and
a set of weights for each query in Q, each weight defining the priority of a respective query in a workload;

The process further to preprocess the inputs to produce a most-granular-partitioning. The process further to process the most-granular-partitioning to produce an initial multi-level partitioned primary index, the processing including determining the scan cost of one of the queries in Q. The process further to process the initial multi-level partitioned primary index to produce a final multi-level partitioned primary index, the processing including determining the query cost of one of the queries in Q. The process further to partition F using the final multi-level partitioned primary index. The process further to run a query from Q against F to produce a result. The process further to store the result.

In general, in one aspect, the invention features a computer program stored in a non-transitory tangible computer readable storage medium. The program includes executable instructions that cause a computer to receive as inputs:

a star schema data model comprising a non-partitioned fact table (F) comprising fields ($f_1, f_2, \ldots f_n$);
a set of queries (Q=$q_1, q_2, \ldots q_m$); and
a set of weights for each query in Q, each weight defining the priority of a respective query in a workload;

The program further including executable instructions that cause the computer to preprocess the inputs to produce a most-granular-partitioning. The program further including executable instructions that cause the computer to process the most-granular-partitioning to produce an initial multi-level partitioned primary index, the processing including determining the scan cost of one of the queries in Q. The program further including executable instructions that cause the computer to process the initial multi-level partitioned primary index to produce a final multi-level partitioned primary index, the processing including determining the query cost of one of the queries in Q. The program further including executable instructions that cause the computer to partition F using the final multi-level partitioned primary index. The program further including executable instructions that cause the computer to run a query from Q against F to produce a result. The program further including executable instructions that cause the computer to store the result.

DETAILED DESCRIPTION

Figure 1:
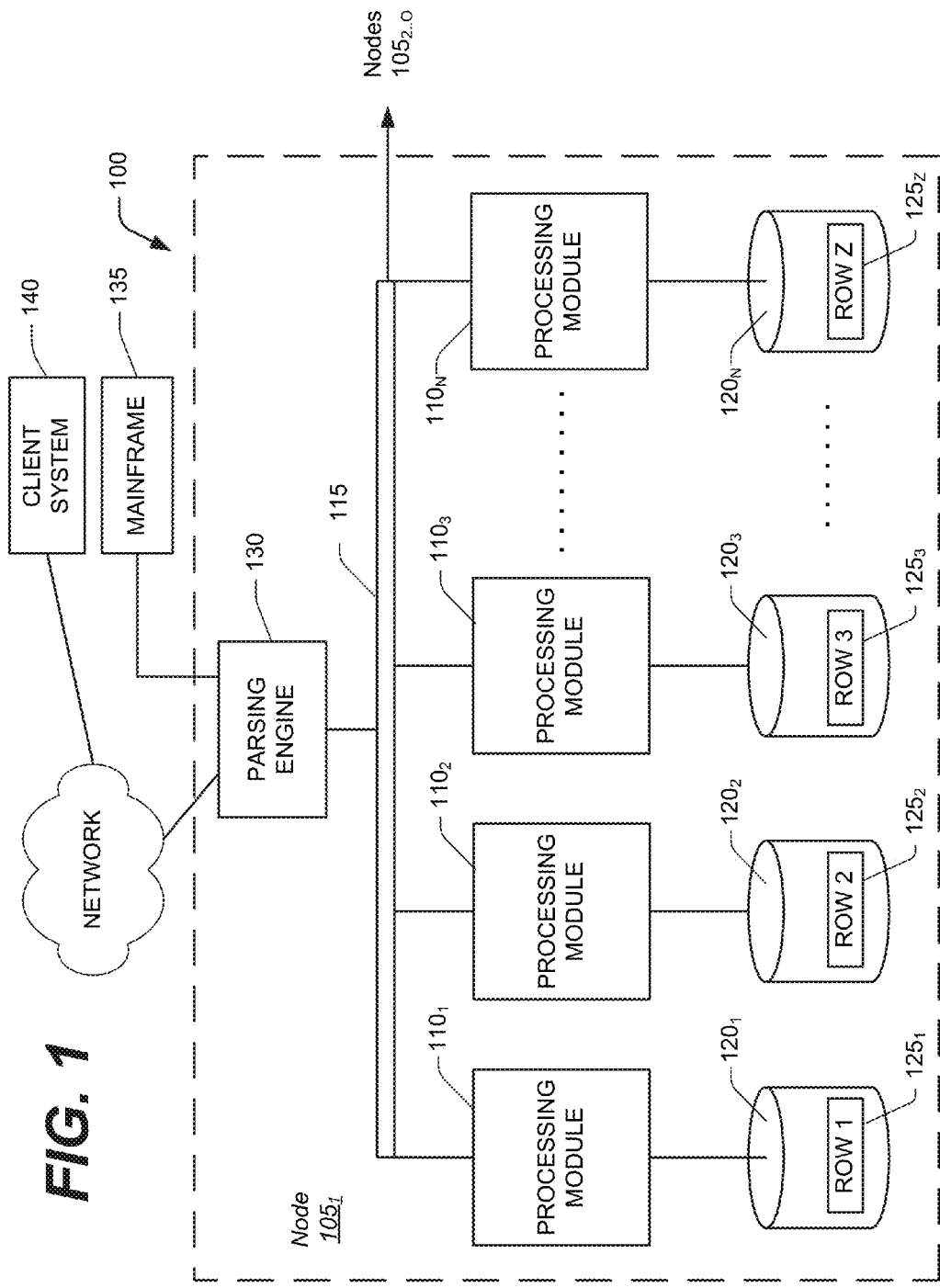
FIG. 1 is one example of a block diagram of a node of a database system.

The MLPPI tool disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
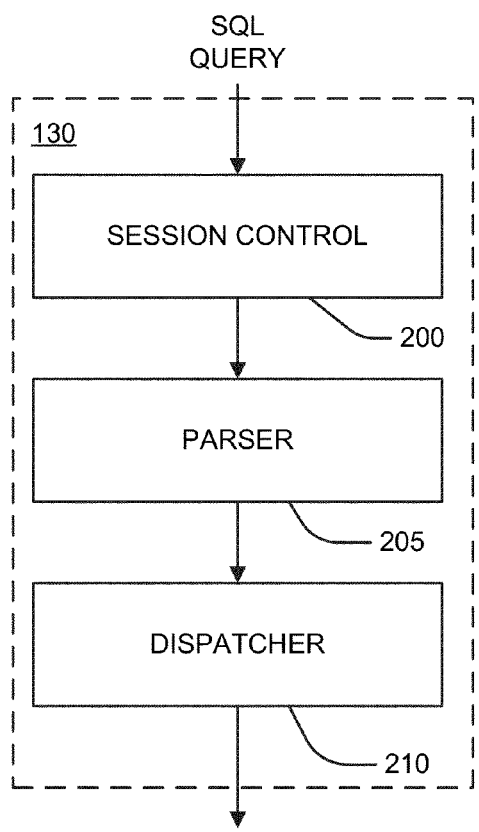
FIG. 2 is one example of a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
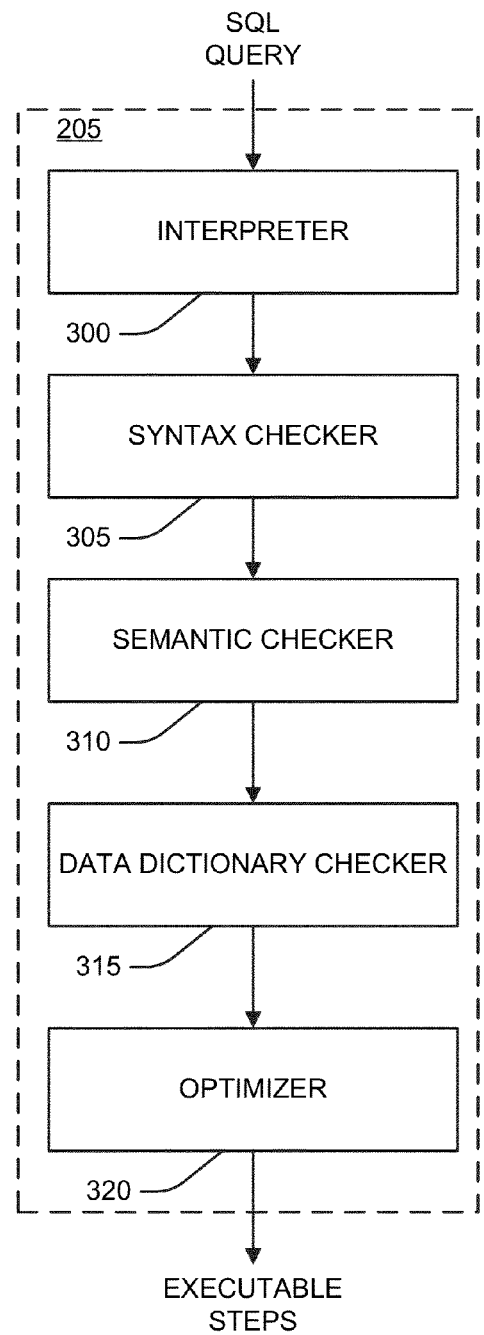
FIG. 3 is a block diagram of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1...N}$ to implement the executable steps.

Choosing the proper MLPPI columns can be a challenge for a database administrator ("DBA"). For example, the number of possible fields from which to choose for partitioning a table could be large. Moreover, some of the chosen fields may have a wide range of values making it challenging to find a proper range for those fields.

The granularity of the MLPPI for a specific workload may also be an issue. Fine-grained partitions potentially can lead to less I/O, since the amount of data to be accessed is reduced. However, numerous partitions can have potential overhead from an optimization and execution perspective. Coarse-grained partitions may result in the opposite condition. Consider a simple workload Q (this example workload will be used throughout this application):

q1:
SELECT SUM(lo_extendedprice*lo_discount)
FROM lineorder l, ddate d
WHERE l.lo_orderdate=d.d_datekey
AND d.d_year='1993'
AND l.lo_discount IN (1, 4, 5)
AND l.lo_quantity<=30
q2:
SELECT c_nation, SUM(lo_revenue)
FROM customer c, lineorder l
WHERE l.lo_custkey=c.c_custkey
AND c.c_region='EUROPE'
AND l.lo_discount>=7
AND l.lo_quantity>=25
AND l.lo_quantity<=35
GROUP BY c.c_nation
ORDER BY revenue desc Q is based on the SSB benchmark, O'Neil, P., O'Neil, B., and Chen, X. The Star Schema Benchmark (SSB), 2007, where the fact table is lineorder while the others, including ddate and customer mentioned above, are dimension tables.

To partition the lineorder table, a DBA may note the following fact table fields: lo_orderdate, lo_custkey, l.lo_discount and lo_quantity. The lo_orderdate and lo_custkey fields are used as join attributes, while the l.lo_discount and lo_quantity fields are single table predicates. Since the first two join fields will be subject to a full scan, the DBA's interests in partitioning can be narrowed down to the latter two fields. The DBA, nevertheless, may struggle to divide the fields l.lo_discount and lo_quantity into proper regions.

There may be quite a few ways, but one way of partitioning fields is to leverage single table predicates in their entirety. With regard to the chosen fields, we can observe the following query conditions: l.lo_discount IN (1, 4, 5), l.lo_discount>=7, l.lo_quantity<=30 and lo_quantity>=25 AND l.lo_quantity<=35. However, lo_quantity field has overlapped conditions in q1 and q2 (i.e., l.lo_quantity<=30 in q1 and l.lo_quantity>=25 AND l.lo_quantity<=35 in q2); thus, a split around the medium value, 30, can be made to separate the common part on that field. As a result, partitioning solution A by this approach can be recommended as shown below:

```
PARTITION BY (
    CASE_N (
        lo_discount = 1,
        lo_discount >= 4 AND lo_discount <= 5,
        lo_discount >= 7,
        NO CASE OR UNKNOWN),
    CASE_N (
        lo_quantity >= 25 AND lo_quantity <= 30,
        lo_quantity > 30 AND lo_quantity <= 35,
        NO CASE OR UNKNOWN)
)
```

The above example shows a MLPPI with two levels derived based on the chosen fields. The total number of partitions made in A is equal to number of ranges for lo_discount×number of ranges for lo_quantity=4 (=1, >=4 AND <=5, >=7, NO CASE)×3 (>=25 AND <=30, >30 AND <=35, NO CASE)=12.

According to the query conditions, q1 will access only two partitions to satisfy the first or second cases on lo_discount and the first case on lo_quantity, and q2 will also access only two partitions to meet the third cases on lo_discount and the first or second cases on lo_quantity. In particular, these partitions are very favorable to the workload, because the accessed partitions will contain only the rows exactly needed by each query. Smaller and larger partitions than A can also be made. For instance, fewer partitions are created by taking the minimum and maximum values for each field. In this coarse-grained way, partitioning solution B can be derived as follows:

```
PARTITION BY (
    CASE_N (
        lo_discount >= 1 AND lo_discount <= 7,
        NO CASE OR UNKNOWN),
    CASE_N (
        lo_quantity >= 25 AND lo_quantity <= 35,
        NO CASE OR UNKNOWN)
)
```

The biggest advantage of the approach is that the solution B makes only 4 partitions in total, which are much less than those of A. The disadvantage is that each query cannot avoid reading rows that need not be in their answers, compared with the solution A. Bigger partitions can also be generated by focusing on each individual value present in the workload. In Q, lo_discount is associated with 1, 4, 5 and 7, and lo_quantity involves 25, 30 and 35. Hence, a fine-grained solution C could be recommended as follows:

```
PARTITION BY (
    CASE_N (
        lo_discount = 1,
        lo_discount = 4,
        lo_discount = 5,
        lo_discount >= 7,
        NO CASE OR UNKNOWN),
    CASE_N (
        lo_quantity < 25,
        lo_quantity >= 25 AND lo_quantity <= 30,
        lo_quantity > 30 AND lo_quantity <= 35,
        lo_quantity > 35,
        NO CASE OR UNKNOWN)
)
```

Similar to A, C can help q1 and q2 retrieve the rows that are exactly needed and included in only a few partitions. However, C requires more partitions (5×5=25) than A and B.

In one embodiment, an MLPPI wizard recommends a specific MLPPI scheme for the fact table in a star schema workload. One embodiment of the tool uses a greedy algorithm for search space enumeration. In one embodiment, the space is driven by the predicates in the queries. This fits an MLPPI scheme based on a general framework allowing general expressions, ranges and case expressions for partition definitions. The workload Q, described above, will be used as an example. In one embodiment, a cost model (in one embodiment, a cost model from TERADATA CORPORATION®) is used to prune the search space to reach an efficient solution. In one embodiment, the tool is completely on the client side and uses existing server application programming interfaces ("APIs") to simplify the workload queries, capture fact table predicates and compute scan and query costs.

In one embodiment, the tool is independent of the DBMS. In one embodiment, the tool makes API calls to the server and receives necessary information only for the partition solution produced in each phase, as discussed below. In one embodiment, the wizard does not require recompilation of the DBMS source code when modified. This flexibility results in little impact on the DBMS, thereby leading to a lightweight design.

Figure 4:
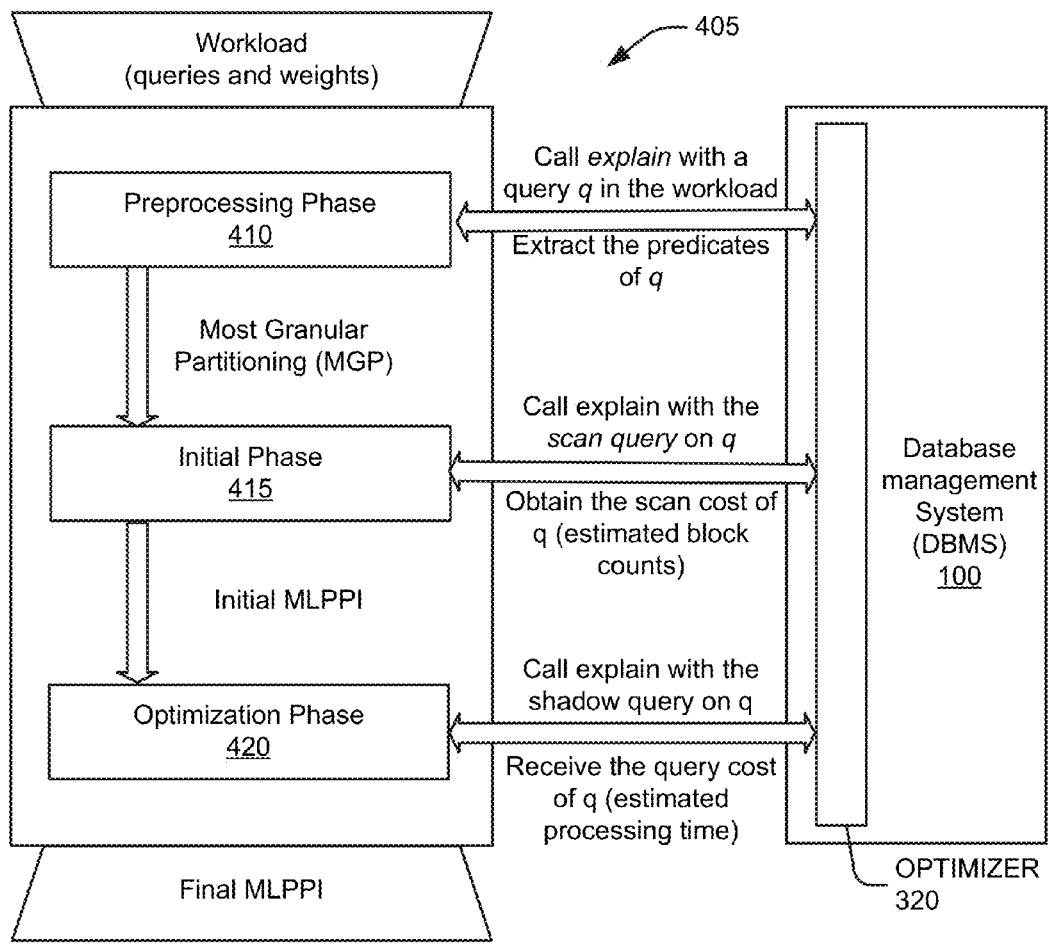
FIG. 4 is a block diagram of a MLPPI tool.

In one embodiment, the tool 405 has three incremental phases, as shown in FIG. 4. In one embodiment, given a set of queries and weights, the tool 405 produces an MLPPI recommendation that is the customized for the workload. In one embodiment, interacting with the DBMS optimizer 320, as illustrated in FIG. 4, it passes through a series of phases: a preprocessing phase 410, an initial phase 415, and an optimization phase 420. In one embodiment, as phases proceed, a less granular partitioning solution is made, and eventually the final MLPPI is reached.

In one embodiment of the preprocessing phase 410, for each query the tool 405 makes an API call to the DBMS in order to extract a list of predicates of that query. Then, in one embodiment, an association between the query and the predicates is made and managed by the tool 405. In this way, all of the mappings can be achieved on the entire query set.

A predicate typically contains a field and a value or values to restrict the field. In one embodiment, it is possible to construct a candidate partition from the predicate. However, there may be many predicates found in the given workload. Some of the predicates could be duplicate, overlapped, or very distinct. In one embodiment, the predicates are classified by fact table field and then simplified them by removing the duplicates or overlaps within the same field if necessary. In one embodiment, this is accomplished by converting each predicate into a corresponding range, and splitting any overlapping ranges. Thereafter, in one embodiment, the tool 405 remaps from a query to ranges through the predicates by transitive property, so that it can proceed to further phases.

In one embodiment, this process produces the Most Granular Partitioning ("MGP") for a fact table, which contains partitions that could be made initially for each (found) field. Depending upon how many predicates appear in the workload, the partitions by MGP can be less or more than the maximum number of partitions allowed in the DBMS 100 (in the current TERADATA CORPORATION system, the maximum is 65,536). In one embodiment, if the number of partitions is greater than the limit, an initial phase 415 is performed. If, in one embodiment, the number of partitions is fewer than the limit, the initial phase 415 is skipped and an optimized phase 420, described below, is performed. Otherwise, in one embodiment, the tool 405 performs the initial phase 415 with the MGP.

In the initial phase 415, in one embodiment, the passed MGP is further refined. In one embodiment, to reduce the search space by the MGP, a pair of consecutive ranges is examined to compute how much I/O cost would be increased once the pair is merged. This I/O cost is called scan cost, which, in one embodiment, is obtained by sending a scan cost query to and receiving the estimate from the DBMS 100. In one embodiment, after all pairs are evaluated, a range pair with the least scan cost sum of all queries is chosen at each iteration, in an approach called a "greedy" approach. In one embodiment, the mapping from query to ranges is also updated by the selection. In this way, in one embodiment, pairs of adjacent ranges are incrementally consolidated. In one embodiment, the initial phase 415 ends if the number of ongoing partitions drops below the maximum allowed by the DBMS 100.

In one embodiment, the optimization phase 420 attempts to reduce the number of partitions. In one embodiment, reducing the number of partitions is beneficial to lessening the overhead of the optimizer 320 in query processing. In one embodiment, the tool 405 examines all remaining ranges in a similar way as is done in the initial phase 415. In one embodiment, the optimization phase 420 uses the query cost of a query, estimated processing time, rather than the scan cost. In one embodiment the query cost is estimated by sending a shadow query to and receiving its estimated processing time from the DBMS 100. In one embodiment, the shadow query is built by executing the original query against a hypothesized MLPPI assuming the merger of a range pair. In one embodiment, a range pair with the minimum query cost sum of all queries is selected. In one embodiment, if merger of the chosen range pair on a particular iteration does not improve the total workload cost, then the task is considered complete and the tool 405 recommends the final MLPPI.

In one embodiment, given a workload Q, the tool 405 produces an MLPPI recommendation for a non-partitioned fact table through the three phases described above. In one embodiment, the tool 405 interacts actively with the DBMS optimizer 320, and suggests the final MLPPI by taking advantage of received predicates or cost estimates. Pseudo-code set 1 is for one embodiment of the tool 405:

Pseudo-Code Set 1: The MLPPI Wizard (Tool 405)
input: A star schema data model with a non-partitioned fact table (F) and number of dimension tables and a set of queries Q
output: MLPPI for F that the total execution cost of the workload is minimal.
Preprocessing Phase (410):
Simplify all queries by calling an API to the DBMS.
Extract all conjuncts and then target fields from Q by leveraging single table predicates on F.
Convert the conjuncts into the corresponding ranges each field that appears at the conjuncts.
Split overlapping ranges into disjoint ones if any.
Initial Phase (415):
If the initial number of partitions (T)>the DBMS limit, then reduce T incrementally by merging a pair of consecutive ranges per field in order of the least scan, or block, cost.
Otherwise, this phase can be skipped.
Optimization Phase (420):
Merge further more partitions by considering a range pair with the least total processing time.

The preprocessing phase 410 is described in more detail below in the discussion of FIG. 5. The initial phase 415 is described in more detail below in the discussion of FIG. 8. The optimization phase 420 is described in more detail below in the discussion of FIG. 10.

Preprocessing Phase
Receive Inputs.

Figure 5:
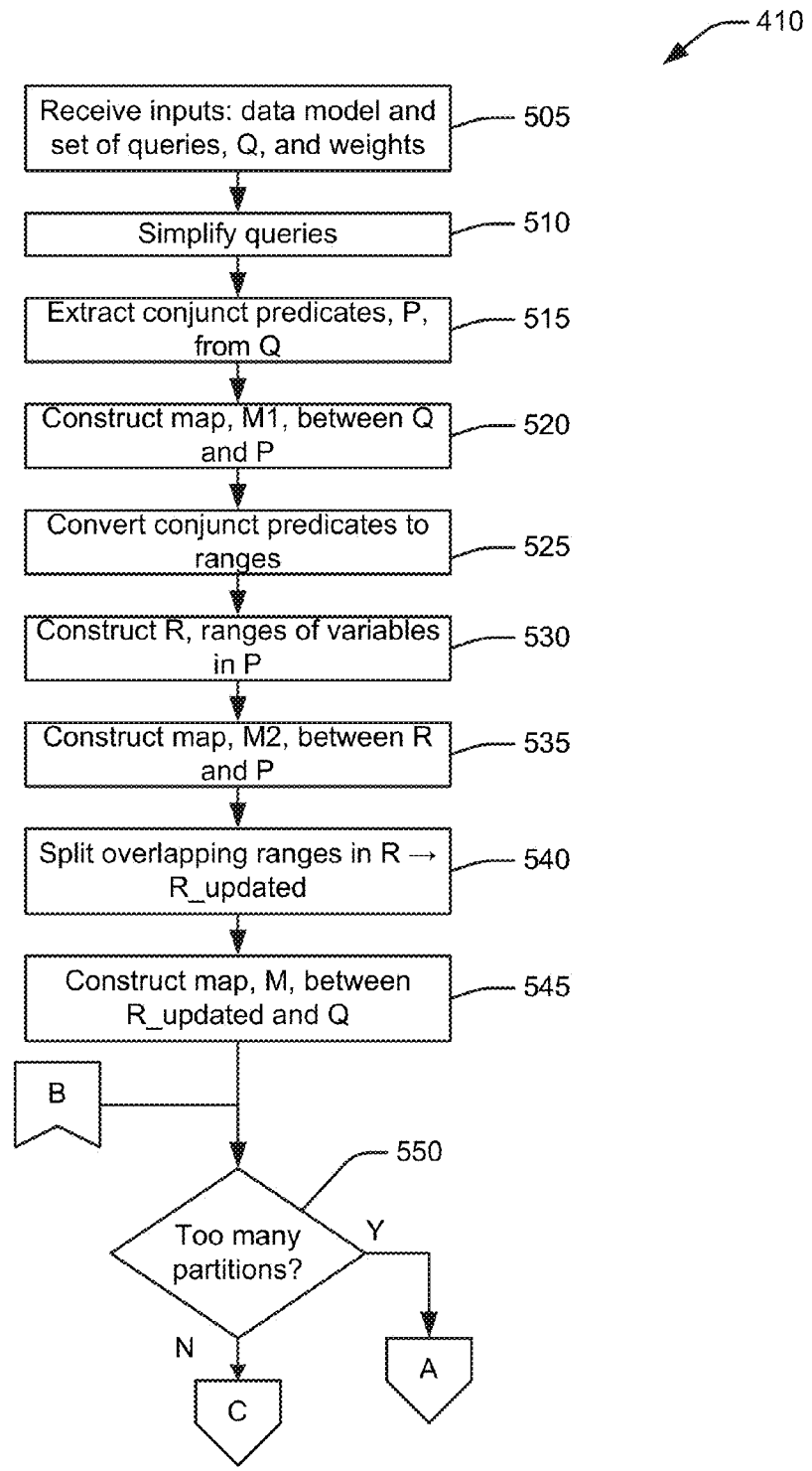
FIGS. 5-10 are block diagrams of elements of the MLPPI tool.

In one embodiment, illustrated in FIG. 5, the preprocessing phase 410 begins with the receipt of the data model (i.e., the star schema described above), a set of queries Q, and weights for each of the queries (block 505).

Query Simplification.

In one embodiment, if queries in a given workload have redundant conditions or unfolded views, the queries can be simplified by removing duplicates, deriving new predicates, and folding the views via an API call made to the DBMS before further processing (block 510). This extra work is not required in the example because q1 and q2 are already clean. Hence, this step can be ignored for the example workload Q.

Conjunct Extraction.

In one embodiment, the next task is to locate and extract all the conjunct predicates in the simplified workload (block 515). In one embodiment, the conjunct extraction is done through an API call to the DBMS 100 that returns the query XML tree. In general, in one embodiment, the conjuncts are in the form:

<variable> <op> <constant>, where <variable> is one of the fields in the fact table, <op> is in $\{=, <, <=, >=, >, IN\}$, and <constant> represents a constant. All <op>s are self-explanatory. In particular, in one embodiment, 'IN' is a list predicate implying 'OR' operator. In one embodiment, a list of predicates P={p1, . . . , p4} is extracted from Q. In one embodiment, the predicates comply with the conjunct form as shown below:

p1: l.lo_discount IN (1, 4, 5)
p2: l.lo_discount>=7
p3: l.lo_quantity<=30
p4: l.lo_quantity>=25 and l.lo_quantity<=35

Next, in one embodiment, a bi-directional map between Q and P, called M1, is constructed so that for each query the corresponding predicate(s) can be found directly and vice versa (block 520). The following association entries, for example, are included in M1:

<q1, {p1, p3}>
<q2, {p2, p4}>

Conversion to Range from Conjunct.

It can be challenging to derive a partition recommendation from pure conjuncts. To make it possible to perform arithmetic operations on conjuncts, in one embodiment, each conjunct is transformed into an equivalent range (block 525).

Assume I to be a list of the fact table fields referenced by P. There are two fields in Q used by P: lo_discount, lo_quantity. These are added to I.

In one embodiment, for each field in I, raw ranges are constructed from the predicates in P. In one embodiment, the outcome is a 2-dimensional array, called R, which captures the range representation by the predicates (block 530). Each entry in R represents a pair of values for the range. Given Q, R is formed by the entries shown below:

| lo_discount | lo_quantity |
|---|---|
| [1, 1] | [∞, 30] |
| [4, 5] | [25, 35] |
| [7, 1] | |

In the range representation, infinity (1) or -infinity (−1) can be used for unbounded ranges. "[" or "]" are used for closed ranges, and "(" or ")" for open ranges.

In one embodiment, R is associated with P, thereby leading to another two-way map, called M2 (block 535). Let r[i, j] denote the range value by the i-th field's j-th range in R. r[1, 3], for instance, indicates lo_discount[7,1]. In the example M2 will be formed by the entries shown below:

<p1, {r[1, 1],r[1, 2]}>
<p2, r[1, 3]>
<p3, r[2, 1]>
<p4, r[2, 2]>

Non-Overlapping Range Construction.

In one embodiment, raw ranges per field are sorted in range order. In the later phases (as discussed below), costs of all range pairs are computed, and the range pair with the least cost is selected for merge in each iteration (block 540). The process assumes the ranges do not overlap with each other, and they are sorted. Therefore, overlapping ranges are split.

Figure 6:
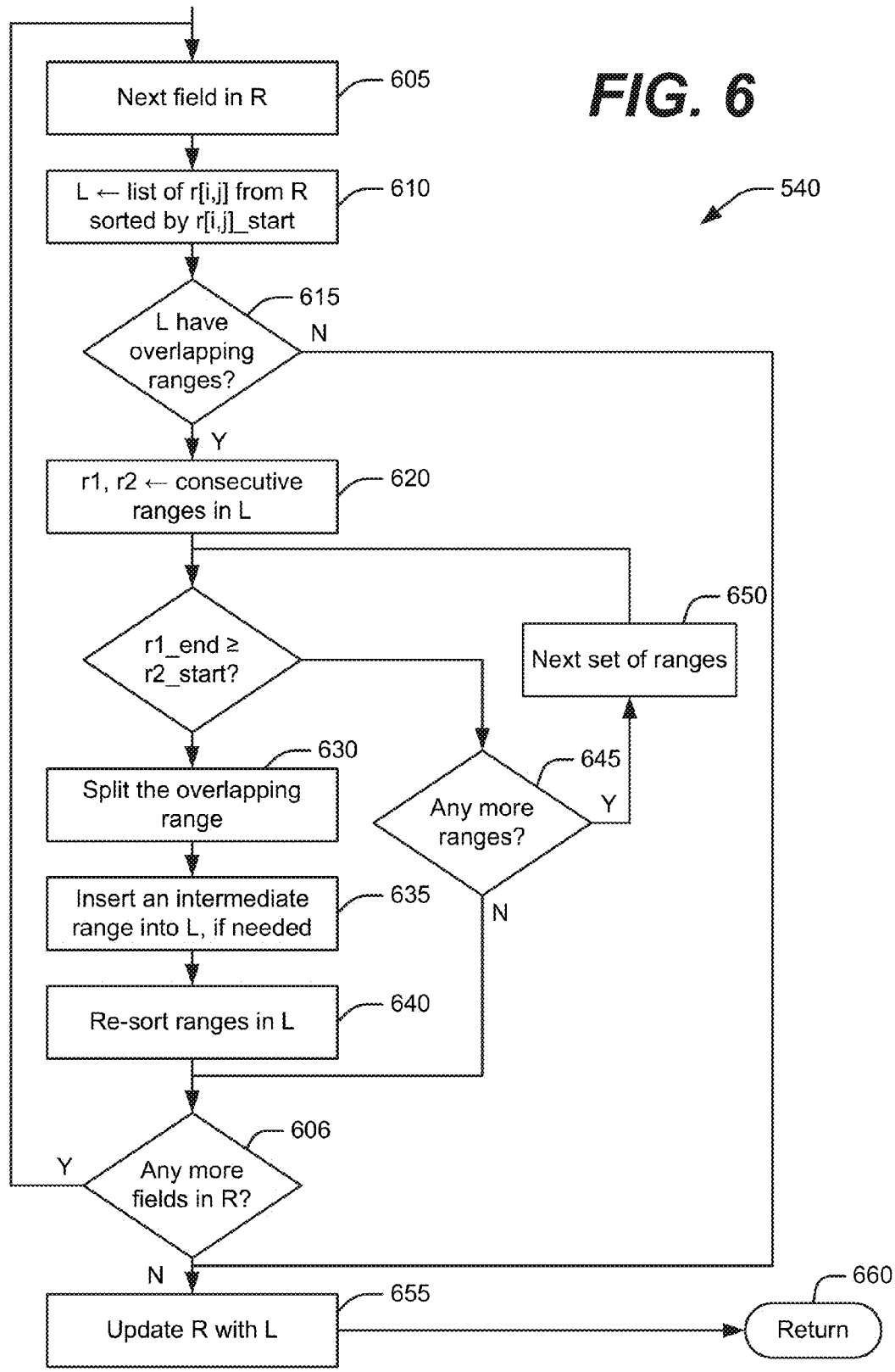

One embodiment of the technique for splitting overlapping ranges (block 540) is shown in pseudo-code set 2, which is illustrated in FIG. 6:

```
Pseudo-code set 2: Splitting overlapping ranges
input : R
output: R with consecutive, non-overlapping ranges
for each field i ∈ R (blocks 605, 606) do
    L ← Get a list of field i's ranges sorted by start
        value (block 610)
    while L has overlapping ranges (block 615) do
        r1, r2 ← Consecutive ranges in L (block 620)
        if r1.end ≥ r2.start (block 625) then
            Split the overlapping range (block 630).
            Insert into L an intermediate range if
            needed (block 635).
            Resort ranges in L (block 640).
        end
        else
            r1 ← r2, r2 ← r3 (blocks 645, 650); /* r3:
            next range */
```

-continued

```
        end
    end
    Update R with the final L (block 655).
end (block 660)
```

Splitting the overlapping range (block 630) occurs is r1 and r2 overlap (i.e., r1.end>=r2.start if r1.start<r2.start or r2.end>=r1.start if r2.start<r1.start) can have two possible cases. In the first case, r2 is contained in r1, the split ranges are:
 a. r1.start, r2.start;
 b. r2.start+1, r2.end;
 c. r2.end+1, r1.end.
A similar split is made if r1 is contained in r2. In the second case, in which r2 overlaps but is not contained within r1 (i.e., r2.end>r1.end), the split ranges are:
 a. r1.start, r2.start;
 b. r2.start+1, r1.end;
 c. r1.end+1, r2.end.

In the example, the lo_quantity field in the example does not have disjoint ranges. The overlap can be removed as described above, and the intermediate range, r[2, 2]=[25, 30] is created. Eventually the updated R (R_updated) is obtained:

| lo_discount | lo_quantity |
|---|---|
| [1, 1] | [∞, 25] |
| [4, 5] | [25, 30] |
| [7, 1] | [31, 35] |

In one embodiment, the existing map M2 between P and R is updated to reflect the split. As a result, p1 and p2 referencing lo_discount are unchanged, but p3 and p4 affected by the split now get associated with {r[2, 1] and r[2, 2]} and {r[2, 2] and r[2, 3]}, respectively. Therefore, the updated M2 is obtained:
 <p1, {r[1, 1],r[1, 2]}>
 <p2, r[1, 3]>
 <p3, r[2, 1], r[2, 2]>
 <p4, r[2, 2], r[2, 3]>
Query-to-Range Map Construction.

In one embodiment, the determination of which query in the workload contains which ranges is accomplished by the transitive property from M1 to M2; namely, a query-to-range map between Q and R_updated, called M, can be built from M1 and M2 (block 545). M for the example is shown below:
 <q1, {r[1,1], r[1,2], r[2,1], r[2,2]}>
 <q2, {r[1,3], r[2,2], r[2,3]}>
Input Partitions.

In some cases, in one embodiment, R_updated can be used to define an MLPPI using each field as one level. In one embodiment, if the number of such partitions (i.e., the product of the number of partitions in each level) is less than or equal to the maximum number of partitions allowed by the DBMS (block 550), then the initial phase can be skipped and processing can move directly to the optimization phase ("N" branch from block 550 through the "C" connector). Otherwise, in one embodiment, processing moves to the initial phase ("Y" branch from block 550 through the "A" connector). Processing returns from the initial phase through the "B" connector.

For example, suppose that the maximum limit of partitions is 15. From R in the example, (# ranges in lo_discount)·(# ranges in lo_quantity)=(3+1)·(3+1)=16 partitions are obtained. Since this exceeds the limit, the initial phase is executed, in which a feasible partition recommendation with the number of partitions less than or equal to the limit can be made. Otherwise, is the number of partitions is smaller than the maximum limit, processing can move directly to the optimization phase.

Note that, in one embodiment, one range is added to each field in the calculation. The reason is that some columns may allow for a NULL value or have a value that does not fall into any range in R. To put it another way, in one embodiment, a default partition is reserved for a field having such a value. Thus, it should also be taken into account for the total partition counts.

In one embodiment, assuming that the current R surpasses the partition limit, processing is now ready to proceed to the initial and/or optimization phases with the prepared M (query-to-range map) and R (input range set per field). M will be used for updating R, and ultimately R will be evolving to a partition recommendation.

Initial Phase

In one embodiment in the initial phase, a merge is incrementally done on a range pair in R until the number of the current partitions is dropped below the max number of partitions allowed. In one embodiment, the incremental consolidation is limited to merging two consecutive ranges, because for each field the range set is sorted in non-decreasing order.

In general, the overall I/O cost may be increased by the merge. In one embodiment, every row is hash-sorted in the DBMS 100. This means that once a query is passed to a certain partition, nonqualified rows belonging to the same partition are read, for a full scan is done on the partition to retrieve the target rows. Therefore, in one embodiment, a heuristic approach is used to pick the range pair that incurs the least I/O cost increase.

To select the best merge yielding the lowest I/O cost, in one embodiment, the scan cost is determined for each query assuming the merge is applied. The scan cost is defined as the number of blocks to be read for the target query, and, in one embodiment, it is obtained by making an API call to the DBMS 100 with a corresponding scan cost query, as described below.

In one embodiment, the API call is made with an "explain" tool to exploit a cost-based optimizer 320 in the DBMS 100. In one embodiment, the explain tool provides the tool 405 with a variety of estimates, such as estimated spool size/processing time/result cardinality/CPU cost, etc. Among the estimates, in one embodiment, the tool 405 leverages the spool size in bytes so that the block counts can be derived from it. In the initial phase 415, in one embodiment, an MLPPI is not derived directly from R which produces more partitions than the maximum limit. Therefore, the spool size is selected for the heuristic. In one embodiment, in the optimization phase 420, the tool 405 will be able to use the estimated processing time, which is more accurate heuristic than the spool size.

In one embodiment, the scan cost query "s" is built as follows:
 SELECT * FROM F WHERE predicate-list,
where "predicate-list" is a list of predicates for the ranges belonging to q according to M. In one embodiment, if q has ranges forming a range pair in examination, then the consolidated range pair substitutes for the ranges temporarily, and it is taken into account in making the predicates of s. Otherwise, in one embodiment, the predicates are constructed from the current ranges mapped to q.

To illustrate, consider a range pair r[2, 2] and r[2, 3]. The pair leads to a merge of ranges [25, 30] and [31, 35] of lo_quantity field. The consolidated range is [25, 35]. In one embodiment, the corresponding scan cost queries, s1 and s2, are built as below:

s1:
SELECT * FROM lineorder l
WHERE l.lo_discount IN (1,4,5)
AND l.lo_quantity<=35
s2:
SELECT * FROM lineorder l
WHERE l.lo_discount>=7
AND l.lo_quantity>=25 AND
l.lo_quantity<=35

In one embodiment, s1 and s2 are sent to the server, and block counts associated with each will be returned. In one embodiment, if the range merge impacts neither q1 nor q2, the above queries s1 and s2 would not be needed; accordingly, the formerly computed scan costs of q1 and q2 will be reused for the current range pair. In one embodiment, the tool 405 will recompute the scan cost of a query if and only if it is affected by a merge of two consecutive ranges.

Figure 7:
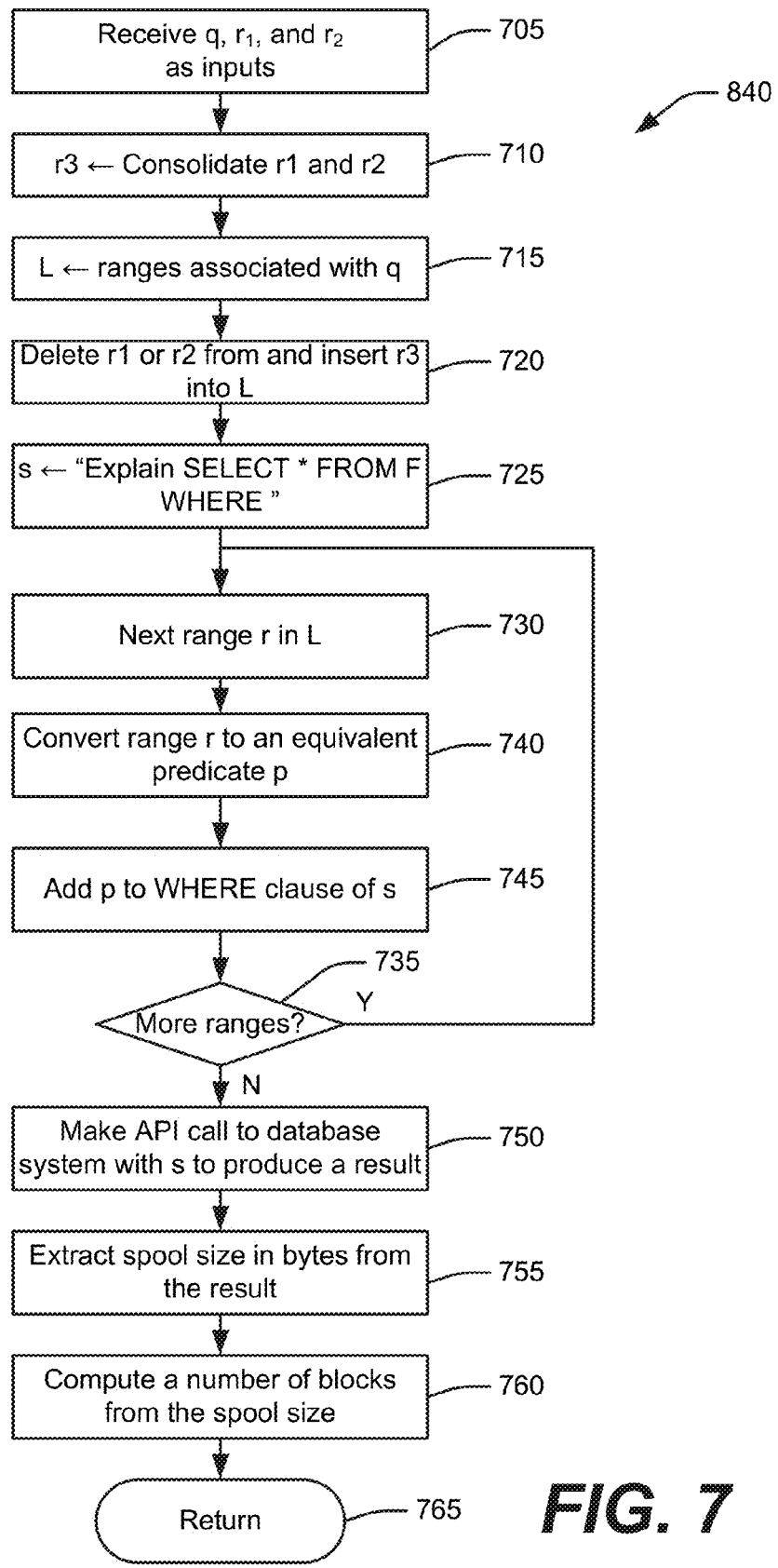

Pseudo-code set 3, illustrated in FIG. 7, shows one embodiment of the scan cost computation on a range pair that influences a query.

Pseudo-Code Set 3: Scan Cost Calculation
input : q (query) and r1 and r2 (range pair) (block 705)
output: Scan cost to answer q, considering a merge of r1 and r2
r3←Consolidate r1 and r2 (block 710);
L←Copy ranges mapped to q (block 715);
Delete r1 and r2 from and insert r3 into L (block 720).
s←"Explain SELECT * FROM fact table WHERE";
/* "Explain" directs the database to create an execution plan, including statistics, without executing the query */
for each r∈L do (blocks 730 and 735)
  Convert r to an equivalent predicate p (block 740).
  Add p to WHERE clause of s (block 745).
end
Make an API call with s to the server (block 750).
Extract the spool size (in bytes) from the returned result (block 755).
blks←Compute # blocks from the spool size (block 760).
return blks (block 765);

In this way, in one embodiment, the weighted sum of scan cost of queries, T, can be computed for each range pair, assuming that each query has its own weight, which is regarded as priority or frequency, in a workload. In one embodiment, T is defined as follows:

$$T = \sum_{i=1}^{n} (\text{scan\_cost}(q_i) \cdot (w_i))$$

where n is the number queries in Q, $q_i$ is a query in Q, and $w_i$ denotes the weight of qi, which falls within 0 and 1.

Once the merge in the example is eventually chosen among all range pairs by the least T, both R and M are updated accordingly, as shown below for the example:

R:

| lo_discount | lo_quantity |
|---|---|
| [1, 1] | [∞, 25] |
| [4, 5] | [25, 35] |
| [7, ∞] | |

M:
<q1, {r[1, 1], r[1, 2], r[2, 1], r[2, 2]}>
<q2, {r[1, 3], r[2, 2]}>

Note that q2 may have the most customized partition based on the current R. The partition formed by r[1, 3]×r[2, 2] has all qualified rows for q2; thus, most of partitions can be eliminated when q2 is served. In contrast, q1 cannot benefit from R as much as q2. Answering q1 would require accessing the entire partitions formed by (R[1, 1]|R[1, 2])×R[2, 2], which contain both qualified and non-qualified rows for q1. This fact addresses the aforementioned trade-off between fine-grained and coarse-grained partitions addressed. Again, the goal of the tool 405 is to produce the MLPPI with the minimum total cost given a workload.

Now that the total number of partitions by the ongoing R is 12, it is below the partition limit (15). The tool 405 can proceed to the optimization phase with R without repeating the initial phase.

One embodiment uses the heuristic that if several range pairs end up leading to the same, least T, the range pair that produces the fewest partitions once applied is chosen. For instance, assume that the number of partitions by the ongoing R is higher than the limit. Then in the continuing example a merge m1 of r[1, 2] and r[1, 3] and another merge m2 of r[2, 1] and r[2, 2] can be considered, and they happen to produce the same T. Since m2 can reduce more partitions than m1 when selected (3×3 by m1 vs. 4×2 by m2), it is chosen as the best merge instead of m1.

Figure 8:
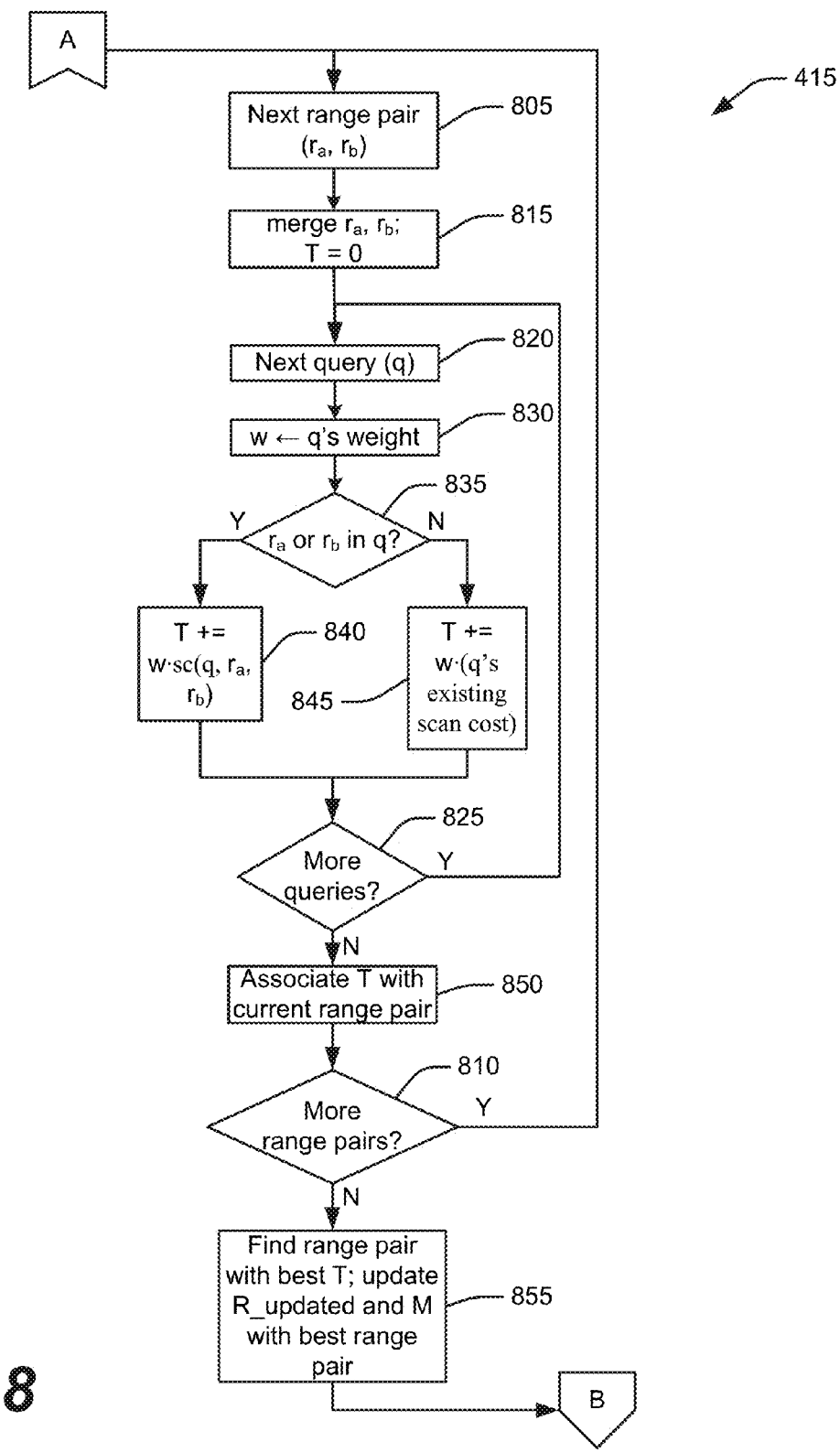

Pseudo-code set 4, which is illustrated in FIG. 8, describes the initial phase 415.

---

Pseudo-code set 4: Initial Phase
input : M (query-to-range map) and R (input range set)
output: MLPPI such that # partitions by R is ≤ LIMIT
while calculateTotalPartitions (R) > LIMIT do
  /* r1 and r2 are consecutive, adjacent */
  for each a range pair of (r1, r2) in R do (blocks 805 and 810)
    r ← Merge r1 and r2 (block 815).
    T ← 0 ; (block 815) /* Sum of weighted scan cost of Q */
    for each q in Q do (blocks 820 and 825)
      w ← q's weight (block 830)
      if (r1 or r2) ∈ q then (block 835) /* Affected */
        T += w · (sc(q, r1, r2)) ; (block (840)/*
        See pseudo-code set 3 */
      else T += w · (q's existing scan cost) (block 845)
    end
    Associated T with the range pair of r1 and r2 (block 850).
  end
  Find the best range pair with the least T. (block 855)
  (Select the range pair to make less partitions in the case of the same least T.)
  Update R and M using the chosen range pair (block 855).
end (return to FIG. 5 through connector B)

---

Optimization Phase

In one embodiment, at the beginning of the optimization phase 420 the tool 405 has arrived at an initial MLPPI solution, e.g., in the example an initial MLPPI solution for the lineorder fact table. The solution can be used as is, but, in one embodiment, decreasing the number of partitions through further merges can enhance the overall workload performance. First, multiple file contexts by many partitions can incur overhead that impacts on the optimizer 320. Second, in one embodiment, the optimizer has a limit of partitions that it can actually access while in execution even though the DBMS itself can allow much more partitions.

In one embodiment, a similar algorithm to that used in the initial phase 415 is applied in the optimization phase 420. In one embodiment, the optimization phase 420 uses an estimated query cost, which is the estimated processing time of a query against the fact table partitioned by an ongoing MLPPI solution and dimension tables.

In one embodiment, for each range pair, the tool 405 determines whether a given query contains one of the ranges in the pair, just as in the initial phase 415. In one embodiment, if the query does have the range(s) in the pair, then its query cost is recomputed, applying the merged range. Otherwise, in one embodiment, the tool uses the previous query cost of the query as determined in the initial phase 415.

In one embodiment, the query cost for each query in a workload is computed as follows. First, in one embodiment, a fictitious partitioning is made based on R (or R' applying a target merge of two ranges in R for the re-computation case). In one embodiment, this is done by creating an empty shadow table S with the same definition as F, propagating the table statistics from F to S, and altering the resulting table by an MLPPI to reflect R (R'). Next, in one embodiment, for each query q a shadow query s is built by replacing F exposed in q with S, and then an API call with s is made to the optimizer 320. Lastly, in one embodiment, the tool 405 fetches the estimated processing time of s and adds it to the total cost in the workload. Again, in one embodiment, the re-computation of query cost is limited to a query that is affected by the merge of a range pair.

Figure 9:
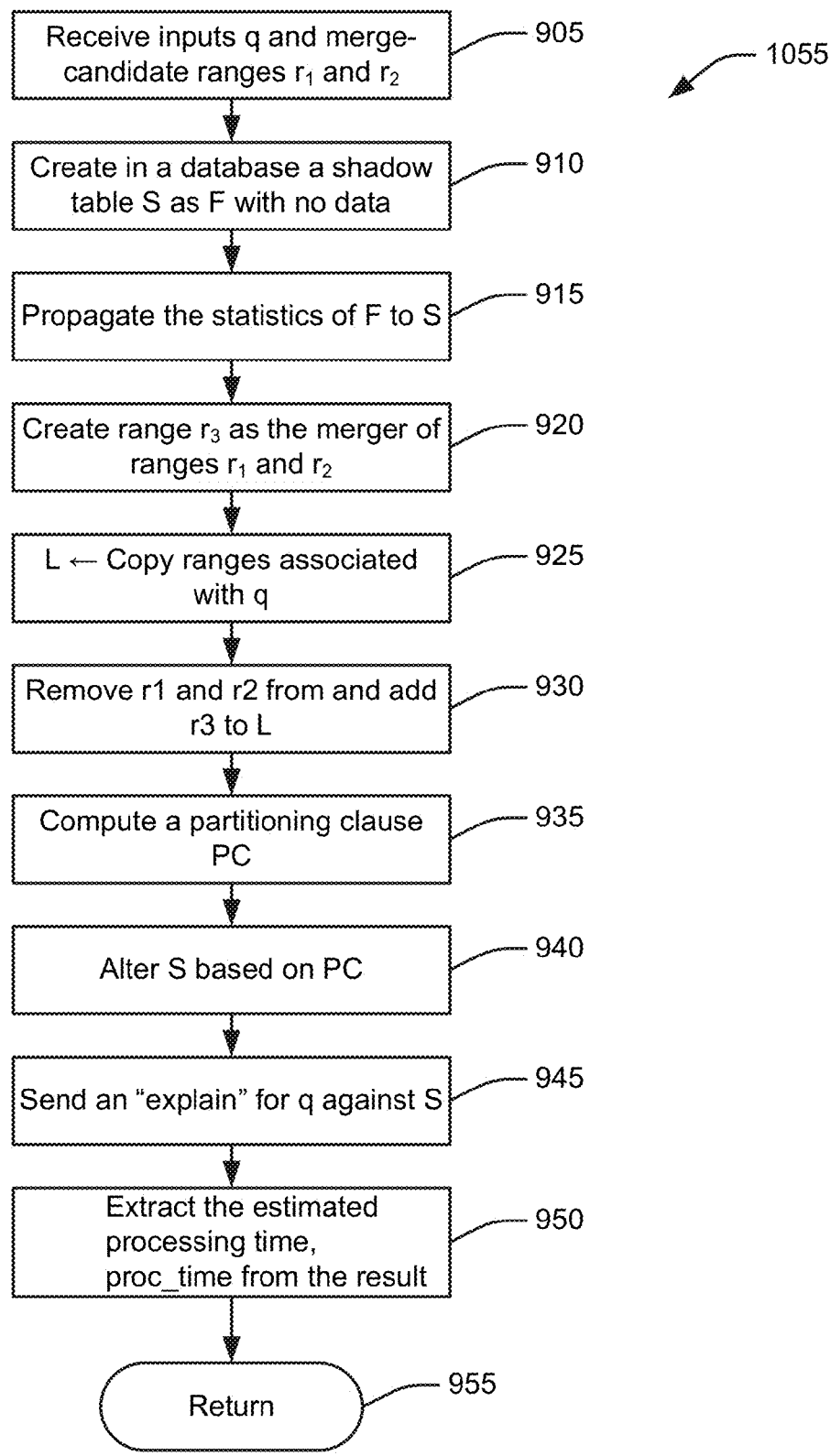

Pseudo-code set 5, shown in FIG. 9, illustrates how the query cost is computed given a range pair affecting a query, as described above.

Pseudo-Code Set 5: Query Cost Computation
    input : q (query) and r1 and r2 (range pair) (block 905)
    output: Query cost to answer q, considering a merge of r1 and r2
    Create a shadow table S as F with no data (block 910).
    Propagate the statistics of F to S (block 915).
    r3←Merge r1 and r2 (block 920);
    L←Copy ranges associated with q (block 925);
    Remove r1 and r2 from and add r3 to L (block 930).
    Compute partitioning clause PC=CreateMLPPI(L) (block 935);
    Alter S, applying a fictitious MLPPI made by PC (block 940).
    Construct and send to the DBMS an "explain" for an S-based shadow query equivalent to q (block 945).
    Extract the estimated processing time, proc_time from the result (block 950).
    return proc_time (block 955);

In one embodiment, the weighted sum of the query cost of queries, T, is computed for each range pair. In one embodiment, T is defined similarly as shown in the initial phase.

Suppose in the example the tool 405 decides to consolidate r[1, 1] and r[1, 2]. Then, in one embodiment, T computed for the merge is stored for the next iteration, and R is also updated along with the merge. In one embodiment, the tool 405 continues to find another range pair for the next merge. In one embodiment, if the chosen merge fails to enhance the existing T, then the wizard completes the optimization phase 420.

Figure 10:
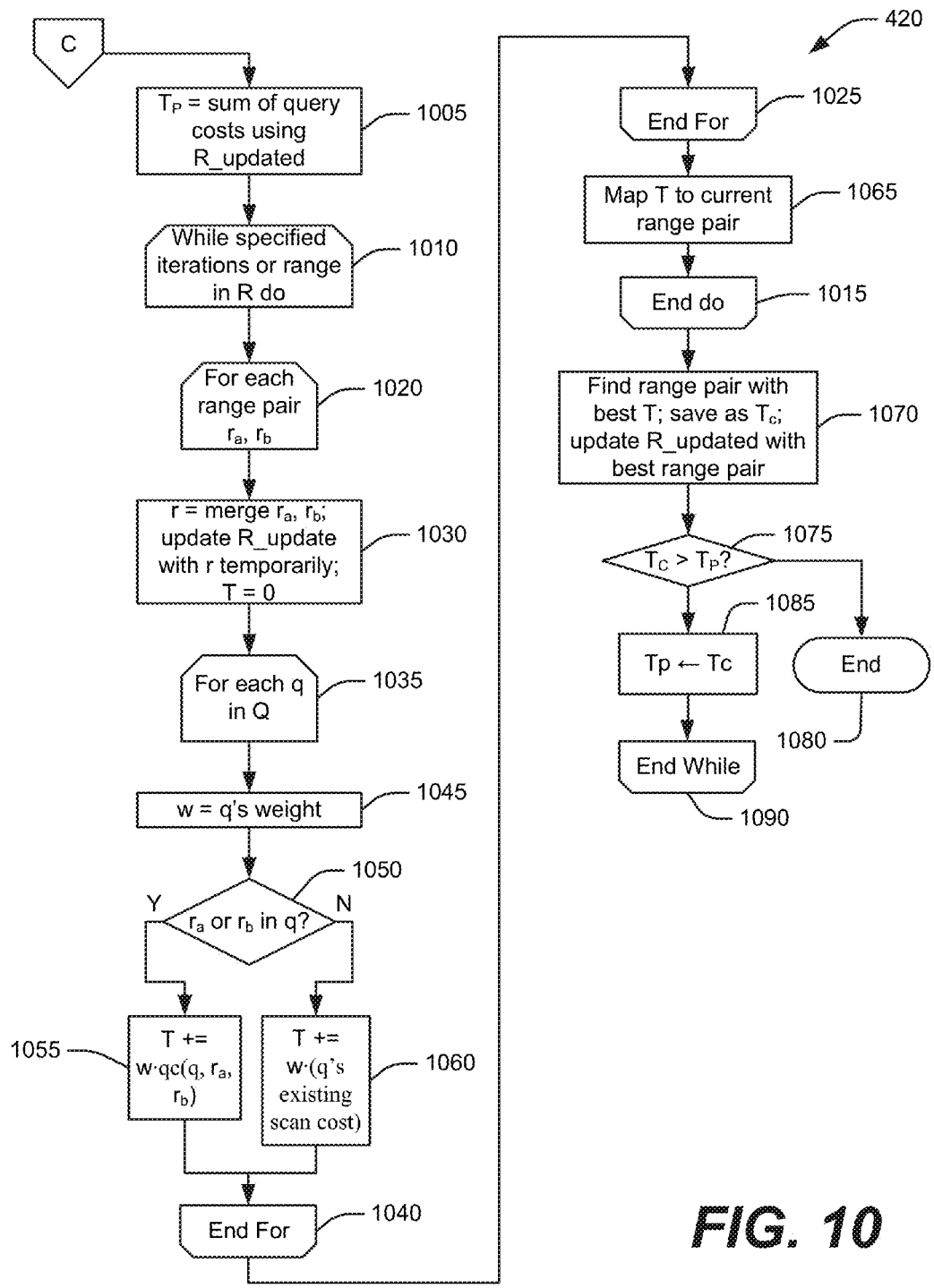

Pseudo-code set 6, shown in FIG. 10, illustrates the optimization phase 420. In one embodiment, the same heuristic described above for the initial phase 415 may be used in the optimization stage 420 to pick the best range pair for a merge.

Pseudo-code set 6: Optimization Phase
    input : R (input range set)
    output: MLPPI such that the total query cost is minimal
    Tp ← Compute and add up all query costs using R (block 1005).
    while specified iterations or no more range in R do (blocks 1010 and 1015)
        for each a range pair of (r1, r2) in R do (blocks 1020 and 1025)
            r ← Merge r1 and r2 (block 1030).
            R0 ← Update R with r, temporarily (block 1030).
            T ← 0 ; (block 1030)/* Weighted query cost sum of Q */
            for each q in Q do (blocks 1035 and 1040)
                w ← q's weight (block 1045)
                if (r1 or r2) ∈ q then (block 1050)/* Affected */
                    T += w · (qc(q, r1, r2)) (block 1055); /* See pseudo-code set 5 */
                else T += w · (q's existing query cost) (block 1060)
            end
            Map T to the current range pair (of r1 and r2) (block 1065).
        end
        Find the best range pair with the least T, or Tc (block 1070).
        (Select the range pair to make less partitions in the case of the same Tc.)
        Update R using the chosen range pair (block 1070).
        if Tc > Tp (block 1075) then Done (block 1080).
        else Tp ← Tc (block 1085)
    end while (block 1090)

In the example, the tool makes the following the final MLPPI recommendation for the lineorder fact table:
    ALTER TABLE lineorder
    MODIFY PRIMARY INDEX
    PARTITION BY (
    CASE N (
        lo_discount__1 AND lo_discount__5,
        lo_discount>7, NO CASE OR UNKNOWN),
    CASE N (
        lo_quantity<25,
        lo_quantity__25 AND lo_quantity__35,
        NO CASE OR UNKNOWN));

Analysis

In this section, the time complexity of the proposed algorithms for the initial or optimized phase is analyzed. For this purpose, time is interpreted as the number of API calls made to the DBMS.

Lemma 5.1. The time complexity for the initial phase or optimization phase is $O(M^2 \cdot N)$, where M is the number of range pairs, and N is the number of queries in a given workload.

Proof. Suppose that a merge for any range pair affects all given queries because every query has any of range elements in the pair. Every iteration the scan or query costs in both of the phases is recomputed for every query. In the first iteration, the cost paid is as much as $M \cdot N$. Once a merge is chosen, then $M-1$ range pairs are remaining in the next iteration, the cost will be equal to $(M-1) \cdot N$. In this way, we may end up consolidating all range pairs and thus having no partition for the fact table. In this worst case, the total calls made to the server can be increased up to:

$$M \cdot N + (M-1) \cdot N + \ldots + N = \left(\sum_{i=1}^{M} i\right) \cdot N = \frac{M(M-1)}{2} \cdot N$$

All things considered, the running time complexity is $O(M^2 \cdot N)$.

The inventor showed that the complexity, $M^2 \cdot N$ is overly pessimistic. In practice, the number of calls made was much fewer than the theoretic bound. The Experiment section that follows describes how many API calls would be made on the workloads used for evaluation.

Experiment

Environment.

The tools 405 was developed on Windows XP platform (although that platform is not necessary) and written in the Java programming language. JDK (Java SE Development Kit) 6 Update 26 version was used for the implementation. All evaluations on the tool's MLPPI recommendation were done on a Teradata DBMS (ver 13.10) server machine running Unix.

Workloads were created using a random star schema query generator. Assuming that 1) operators, 2) fields and 3) minimum and maximum values per field are already known, the generator first determines how many predicates are needed along with the number of fields in a fact table. It then selects a field and a operator arbitrarily. If the IN operator is chosen, the query generator determines how many values are added to the list and then randomly picks up the corresponding number of values between the minimum and maximum values of the chosen field. Otherwise, just a single random value is used on the chosen operator. The generator builds a query having the desired predicates.

Each query created by the generator is based on a template query that joined the lineorder and the date dimension with constraints on selected fields of the lineorder table. This template is common in customer cases like reports and form templates. Based on the template, two sets of 10 and 20 queries were generated by varying the constraints on lineorder.

Statistics.

While producing the recommendations for the two sets of workload, a variety of statistics about input partitions, range pairs, number of API calls and total iterations were collected. The statistics for the workloads is shown in Table 1.

TABLE 1

|  | Initial Phase | | Optimization Phase | |
|---|---|---|---|---|
|  | 10 queries | 20 queries | 10 queries | 20 queries |
| # Input partitions | 1,008,000 | 110,739,200 | 51,840 | 59,520 |
| # Total iterations | 15 | 55 | 1 | 1 |
| # Input range pairs | 441 | 4,180 | 24 | 48 |
| # Total API calls (worst calls by Lemma 5.1) | 1,305 (1,944,810) | 31,915 (349,448,000) | 78 (5,760) | 388 (46,080) |
| Average API calls per range pair | 2.96 | 7.63 | 3.25 | 8.08 |

About 1 million partitions were derived initially from 10 queries, whereas roughly 0.11 billion partition from 20 queries. The workload size doubled, but the total number of partitions was increased exponentially. Because the number and variety of predicates contained in the 20-query workload quantitatively overwhelmed those of the 10-query-workload, two orders of magnitude more ranges were observed. The initial search space can be sensitive to the size of workload, but nevertheless, we will show that the tool 405 is capable of producing good quality recommendation.

The total number of iterations tended to be proportional to the input partitions given to the initial phase across the workloads. There was only one iteration in the optimized phase. The partitions produced by the initial phase were complete enough, so more iterations were not necessary to optimize them through the further phase.

The number of collected range pairs per field was relatively small, compared with the input partitions. The range pairs were considered for a merge in the phases, and they were reduced as a pick is made in each iteration.

The inventors doubted that the running time complexity expression of $O(M^2 \cdot N)$ derived above, because it would be very rare for a range pair to be associated with all queries in a workload. As illustrated in Table 1, the total calls made to the server per workload were far fewer than the theoretical bounds, which are shown in parentheses and computed using number of queries and range pairs in each phase. In particular, the average number of API calls per range pair was limited within 10 across workloads and phases.

Performance Evaluation.

Figure 11:
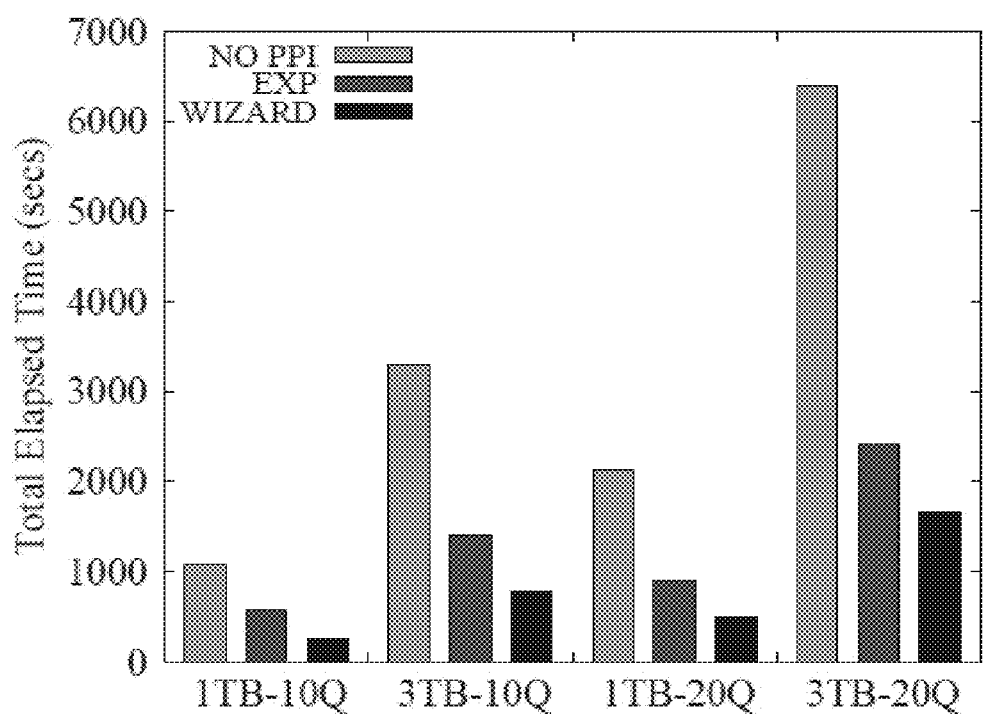
FIG. 11 is an illustration of test results.

The main goal of the evaluation was to see the quality of an MLPPI recommendation made by the tool 405 compared with that of no partitioning (NO PPI) and the partitioning done similarly by previous work (Agrawal, S., Narasayya, V., and Yang, B., Integrating Vertical and Horizontal Partitioning into Automated Physical Database Design, Proceedings of the 2004 ACM SIGMOD (2004), ACM, pp. 359-370; Zilio, D., Rao, J., Lightstone, S., G., L., Storm, A., C., G. A., and Fadden, S., DB2 Design Advisor: Integrated Automatic Physical Database, Proceedings of the 2004 VLDB (2004), Morgan Kaufmann Publishers Inc., pp. 1087-1097) (EXP). The results are summarized in FIG. 11, showing the total run time in seconds. Overall, the tool's recommendation was very effective at partitioning the fact table using the referenced fields and restricting values in the workloads. The total speedups made by the MLPPI recommendations were two or three times more efficient than those by the NOPPI and EXP schemes across workloads and fact table scales. Furthermore, the tool's solutions scaled well with increasing data size and workload size. Although scaling up the fact table from 1 TB and 3 TB, we did not observe any significant rise in the total cost of each workload. Increasing workloads could not quite affect the total cost against the same fact table size. These results ensure the superiority of the MLPPI algorithms against the existing work.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   receiving as inputs:
      a star schema data model comprising a non-partitioned fact table (F) comprising fields ($f_1, f_2, \ldots f_n$);
      a set of queries ($Q=q_1, q_2, \ldots q_m$); and
      a set of weights for each query in Q, each weight defining the priority of a respective query in a workload;
   preprocessing the inputs to produce a most-granular-partitioning;
   processing the most-granular-partitioning to produce an initial multi-level partitioned primary index, the processing including determining the scan cost of one of the queries in Q;

processing the initial multi-level partitioned primary index to produce a final multi-level partitioned primary index, the processing including determining the query cost of one of the queries in Q;

partitioning F using the final multi-level partitioned primary index;

running a query from Q against F to produce a result; and storing the result.

2. The method of claim 1 wherein preprocessing the inputs to produce a most granular partitioning comprises:

extracting a set of conjunct predicates ($P=p_1, p_2, \ldots p_O$) from Q, each conjunct predicate having the form:

<variable><op><constant>;

where:

<variable>$\epsilon(f_1, f_2, \ldots f_n)$

<op>$\epsilon\{=, <, \leq, \geq, >, IN\}$; and

<constant> is a constant;

constructing a map, M1, between Q and P;

converting the conjunct predicates to ranges;

constructing an array, R, of the form:

| $f_1$ | $f_2$ | ... | $f_n$ |
|---|---|---|---|
| r[1, 1] | r[2, 1] | ... | r[n, 1] |
| r[1, 2] | r[2, 2] | ... | r[n, 2] |
| ... | ... | ... | ... |
| r[1, last$_1$] | ... | ... | ... |
| | r[2, last$_2$] | ... | ... |
| | | | r[n, last$_n$] | where r[i,j] is the i-th field's j-th range in R, where r[i,j] has a start value, r[i,j]_start, and an end value r[i,j]_end; and last$_1$, last$_2$, ..., last$_n \geq 1$;

constructing a map, M2, between R and P, of the form:

<$p_1, r_{11}, r_{12}, \ldots r_{1last}$>

$p_2, r_{21}, r_{22}, \ldots r_{2last}$

...

<$p_O, r_{O1}, r_{O2}, \ldots r_{Olast}$> where $r_{ab}$ is the $b^{th}$ range associated with conjunct predicate $p_a\epsilon(p_1, p_2, \ldots, p_O)$; and $r_{1last}, r_{2last}, \ldots, r_{Olast} \geq 1$;

splitting overlapping ranges in R to produce R_updated, R_updated being the most-granular-partitioning;

constructing a map, M, between R_updated and Q, of the form:

<$q_1$, ranges from fields in conjunct predictes in $q_1$>

<$q_2$, ranges from fields in conjunct predictes in $q_2$>

...

<$q_m$, ranges from fields in conjunct predictes in $q_m$>.

3. The method of claim 2 wherein splitting overlapping ranges in R comprises:

for each field in R:

L←list of r[i,j] from R sorted by r[i,j]_start;

while L has overlapping ranges do:

r1, r2←consecutive ranges in L if r1_end≥r2_start:

modify r1 and r2 in a non-decreasing order;

insert into L an intermediate range, if needed;

re-sort ranges in L;

else:

r1←r2, r2←r3, r3 being the next higher range in L; and update R with L.

4. The method of claim 2 wherein processing the most granular partitioning to produce an initial multi-level partitioned primary index comprises:

(a) determining that the product:

S=(the number of ranges associated with $q_1$ in M)×

(the number of ranges associated with $q_2$ in M)×

... (the number of ranges associated with $q_m$ in M)

is greater than T, the number of partitions allowed by a database system, and, in response:

finding the two ranges associated that, when merged, have the smallest weighted scan cost for each query in Q; and merging the two found ranges in R update;

(b) repeating (a) until the product S is less than or equal to T.

5. The method of claim 4 wherein finding a scan cost for a query $q_t\epsilon Q$, and merge-candidate ranges $r_1$ and $r_2$, $r_1$ and $r_2$ being ranges associated with $q_t$ in M comprises:

creating range $r_3$ as the merger of ranges $r_1$ and $r_2$;

L←ranges associated with q;

removing $r_1$ and $r_2$ from L and adding $r_3$ to L;

s←"Explain SELECT * FROM F WHERE";

for each range r∈L:

convert r to an equivalent predicate p; and add p to WHERE clause of s;

make an API call to the database system with s to produce a result;

extract a spool size in bytes from the result; and compute a number of blocks from the spool size.

6. The method of claim 4 processing the initial multi-level partitioned primary index to produce a final multi-level partitioned primary index comprises:

(c) finding two ranges associated with a query belonging to Q and a variable in the query that, when merged, have the smallest weighted query cost;

(d) merging the two ranges in R_update; and repeating (c) and (d) for a number of iterations;

partitioning F using R_update as a guide.

7. The method of claim 6 wherein finding a query cost for a query $q_t\epsilon Q$, with merge-candidate ranges $r_1$ and $r_2$, $r_1$ and $r_2$ being ranges associated with $q_t$ in S comprises:

creating in a database system a shadow table ST as F with no data;

propagating the statistics of F to ST;

creating range $r_3$ as the merger of ranges $r_1$ and $r_2$;

copying ranges associated with q into L;

removing $r_1$ and $r_2$ from L and adding $r_3$ to L;

computing a partitioning clause PC by:

creating an alter statement to partition ST so that each range in L defines a partition;

altering ST based on PC;

creating an explain statement for $q_t$ and determining a query cost of executing $q_t$ against ST by making an API call to the database system with the explain statement to produce a result:

estimating the processing time from the result; and returning the estimated processing time as the query cost.

8. A database system comprising:

one or more nodes;

a plurality of Central Processing Units (CPUs), each of the one or more nodes providing access to one or more CPUs;

a plurality of virtual processes, each of the one or more CPUs providing access to one or more virtual processes;

each virtual process configured to manage data, including rows from the set of database table rows, stored in one of a plurality of data-storage facilities;

a process to:
  receive as inputs:
    a star schema data model comprising a non-partitioned fact table (F) comprising fields $(f_1, f_2, \ldots f_n)$;
    a set of queries $(Q=q_1, q_2, \ldots q_m)$; and
    a set of weights for each query in Q, each weight defining the priority of a respective query in a workload;
  preprocess the inputs to produce a most-granular-partitioning;
  process the most-granular-partitioning to produce an initial multi-level partitioned primary index, the processing including determining the scan cost of one of the queries in Q;
  process the initial multi-level partitioned primary index to produce a final multi-level partitioned primary index, the processing including determining the query cost of one of the queries in Q;
  partition F using the final multi-level partitioned primary index;
  run a query from Q against F to produce a result; and
  store the result.

9. The database system of claim 8 wherein preprocessing the inputs to produce a most granular partitioning comprises:
  extracting a set of conjunct predicates $(P=p_1, p_2, \ldots p_O)$ from Q, each conjunct predicate having the form:
    <variable><op><constant>;
  where:
    $<variable> \in (f_1, f_2, \ldots f_n)$
    $<op> \in \{=, <, \leq, \geq, >, IN\}$; and
    <constant> is a constant;
  constructing a map, M1, between Q and P;
  converting the conjunct predicates to ranges;
  constructing an array, R, of the form:

| $f_1$ | $f_2$ | ... | $f_n$ |
|---|---|---|---|
| r[1, 1] | r[2, 1] | ... | r[n, 1] |
| r[1, 2] | r[2, 2] | ... | r[n, 2] |
| ... | ... | ... | ... |
| r[1, $last_1$] | ... | ... | ... |
| | r[2, $last_2$] | ... | ... |
| | | | r[n, $last_n$] | where
    r[i,j] is the i-th field's j-th range in R, where r[i,j] has a start value, r[i,j]_start, and an end value r[i,j]_end; and
    $last_1, last_2, \ldots, last_n \geq 1$;
  constructing a map, M2, between R and P, of the form:
    $<p_1, r_{11}, r_{12}, \ldots r_{1last}>$
    $<p_2, r_{21}, r_{22}, \ldots r_{2last}>$
    ...
    $<p_{PO}, r_{O1}, r_{O2}, \ldots r_{Olast}>$
  where
    $r_{ab}$ is the $b^{th}$ range associated with conjunct predicate $p_a \in (p_1, p_2, \ldots, p_O)$; and
    $r_{1last}, r_{2last}, \ldots, r_{Olast} \geq 1$;
  splitting overlapping ranges in R to produce R_updated, R_updated being the most-granular-partitioning;
  constructing a map, M, between R_updated and Q, of the form:
    $<q_1$, ranges from fields in conjunct predictes in $q_1>$
    $<q_2$, ranges from fields in conjunct predictes in $q_2>$
    ...
    $<q_m$, ranges from fields in conjunct predictes in $q_m>$.

10. The database system of claim 9 wherein splitting overlapping ranges in R comprises:
  for each field in R:
    L←list of r[i,j] from R sorted by r[i,j]_start;
    while L has overlapping ranges do:
      r1, r2←consecutive ranges in L
      if r1_end≥r2_start:
        modify r1 and r2 in a non-decreasing order;
        insert into L an intermediate range, if needed;
        re-sort ranges in L;
      else:
        r1←r2, r2←r3, r3 being the next higher range in L; and
    update R with L.

11. The database system of claim 9 wherein processing the most granular partitioning to produce an initial multi-level partitioned primary index comprises:
  (a) determining that the product:
    S=(the number of ranges associated with $q_1$ in M)×
    (the number of ranges associated with $q_2$ in M)×
    ...
    (the number of ranges associated with $q_m$ in M)
    is greater than T, the number of partitions allowed by a database system, and, in response:
    finding the two ranges associated that, when merged, have the smallest weighted scan cost for each query in Q; and
    merging the two found ranges in R update;
  (b) repeating (a) until the product S is less than or equal to T.

12. The database system of claim 11 wherein (a) comprises finding a scan cost for a query $q_t \in Q$, and merge-candidate ranges $r_1$ and $r_2$, $r_1$ and $r_2$ being ranges associated with $q_t$ in M:
  creating range $r_3$ as the merger of ranges $r_1$ and $r_2$;
  L←ranges associated with q;
  removing $r_1$ and $r_2$ from L and adding $r_3$ to L;
  s←"Explain SELECT * FROM F WHERE";
  for each range r∈L:
    convert r to an equivalent predicate p; and
    add p to WHERE clause of s;
  make an API call to the database system with s to produce a result;
  extract a spool size in bytes from the result; and
  compute a number of blocks from the spool size.

13. The database system of claim 11 processing the initial multi-level partitioned primary index to produce a final multi-level partitioned primary index comprises:
  (c) finding two ranges associated with a query belonging to Q and a variable in the query that, when merged, have the smallest weighted query cost;
  (d) merging the two ranges in R_update; and
  repeating (c) and (d) for a number of iterations;
  partitioning F using R_update as a guide.

14. The database system of claim 13 wherein finding a query cost for a query $q_t \in Q$, with merge-candidate ranges $r_1$ and $r_2$, $r_1$ and $r_2$ being ranges associated with $q_t$ in S:
  creating in a database system a shadow table ST as F with no data;
  propagating the statistics of F to ST;
  creating range $r_3$ as the merger of ranges $r_1$ and $r_2$;
  copying ranges associated with q into L;
  removing $r_1$ and $r_2$ from L and adding $r_3$ to L;
  computing a partitioning clause PC by:

creating an alter statement to partition ST so that each range in L defines a partition;
altering ST based on PC;
creating an explain statement for $q_t$ and
determining a query cost of executing $q_t$ against ST by making an API call to the database system with the explain statement to produce a result:
estimating the processing time from the result; and
returning the estimated processing time as the query cost.

15. A computer program stored in a non-transitory tangible computer readable storage medium, the program comprising executable instructions that cause a computer to:
receive as inputs:
a star schema data model comprising a non-partitioned fact table (F) comprising fields ($f_1, f_2, \ldots f_n$);
a set of queries ($Q=q_1, q_2, \ldots q_m$); and
a set of weights for each query in Q, each weight defining the priority of a respective query in a workload;
preprocess the inputs to produce a most-granular-partitioning;
process the most-granular-partitioning to produce an initial multi-level partitioned primary index, the processing including determining the scan cost of one of the queries in Q;
process the initial multi-level partitioned primary index to produce a final multi-level partitioned primary index, the processing including determining the query cost of one of the queries in Q;
partition F using the final multi-level partitioned primary index;
run a query from Q against F to produce a result; and
store the result.

16. The method of claim 15 wherein preprocessing the inputs to produce a most granular partitioning comprises:
extracting a set of conjunct predicates ($P=p_1, p_2, \ldots p_O$) from Q, each conjunct predicate having the form:
<variable><op><constant>;
where:
<variable>$\in(f_1, f_2, \ldots f_n)$
<op>$\in \{=, <, \leq, \geq, >, IN\}$; and
<constant> is a constant;
constructing a map, M1, between Q and P;
converting the conjunct predicates to ranges;
constructing an array, R, of the form:

| $f_1$ | $f_2$ | $\ldots$ | $f_n$ |
|---|---|---|---|
| r[1, 1] | r[2, 1] | $\ldots$ | r[n, 1] |
| r[1, 2] | r[2, 2] | $\ldots$ | r[n, 2] |
| $\ldots$ | $\ldots$ | $\ldots$ | $\ldots$ |
| r[1, $last_1$] | $\ldots$ | $\ldots$ | $\ldots$ |
| | r[2, $last_2$] | $\ldots$ | $\ldots$ |
| | | | r[n, $last_n$] | where
r[i,j] is the i-th field's j-th range in R, where r[i,j] has a start value, r[i,j]_start, and an end value r[i,j]_end; and
$last_1, last_2, \ldots, last_n \geq 1$;
constructing a map, M2, between R and P, of the form:
$<p_1, r_{11}, r_{12}, \ldots r_{1last}>$
$<p_2, r_{21}, r_{22}, \ldots r_{2last}>$
$\ldots$
$<p_O, r_{O1}, r_{O2}, \ldots r_{Olast}>$ where
$r_{ab}$ is the $b^{th}$ range associated with conjunct predicate $p_a \in (p_1, p_2, \ldots, p_O)$; and
$r_{1last}, r_{2last}, \ldots, r_{Olast} \geq 1$;
splitting overlapping ranges in R to produce R_updated, R_updated being the most-granular-partitioning;
constructing a map, M, between R_updated and Q, of the form:
$<q_1$, ranges from fields in conjunct predictes in $q_1>$
$<q_2$, ranges from fields in conjunct predictes in $q_2>$
$\ldots$
$<q_m$, ranges from fields in conjunct predictes in $q_m>$.

17. The method of claim 16 wherein splitting overlapping ranges in R comprises:
for each field in R:
L←list of r[i,j] from R sorted by r[i,j]_start;
while L has overlapping ranges do:
r1, r2←consecutive ranges in L
if r1_end←r2_start:
modify r1 and r2 in a non-decreasing order;
insert into L an intermediate range, if needed;
re-sort ranges in L;
else:
r1←r2, r2←r3, r3 being the next higher range in L; and
update R with L.

18. The method of claim 16 wherein processing the most granular partitioning to produce an initial multi-level partitioned primary index comprises:
(a) determining that the product:
S=(the number of ranges associated with $q_1$ in M)×
(the number of ranges associated with $q_2$ in M)×
$\ldots$
(the number of ranges associated with $q_m$ in M)
is greater than T, the number of partitions allowed by a database system, and, in response:
finding the two ranges associated that, when merged, have the smallest weighted scan cost for each query in Q; and
merging the two found ranges in R update;
(b) repeating (a) until the product S is less than or equal to T.

19. The method of claim 18 wherein (a) comprises finding a scan cost for a query $q_t \in Q$, and merge-candidate ranges $r_1$ and $r_2$, $r_1$ and $r_2$ being ranges associated with $q_t$ in M:
creating range $r_3$ as the merger of ranges $r_1$ and $r_2$;
L←ranges associated with q;
removing $r_1$ and $r_2$ from L and adding $r_3$ to L;
s←"Explain SELECT * FROM F WHERE";
for each range r∈L:
convert r to an equivalent predicate p; and
add p to WHERE clause of s;
make an API call to the database system with s to produce a result;
extract a spool size in bytes from the result; and
compute a number of blocks from the spool size.

20. The method of claim 18 processing the initial multi-level partitioned primary index to produce a final multi-level partitioned primary index comprises:
(c) finding two ranges associated with a query belonging to Q and a variable in the query that, when merged, have the smallest weighted query cost;
(d) merging the two ranges in R_update; and
repeating (c) and (d) for a number of iterations;
partitioning F using R_update as a guide.

* * * * *